Aug. 1, 1944.  H. HELLAN  2,354,752
STRAINER
Filed Aug. 3, 1942  2 Sheets-Sheet 1
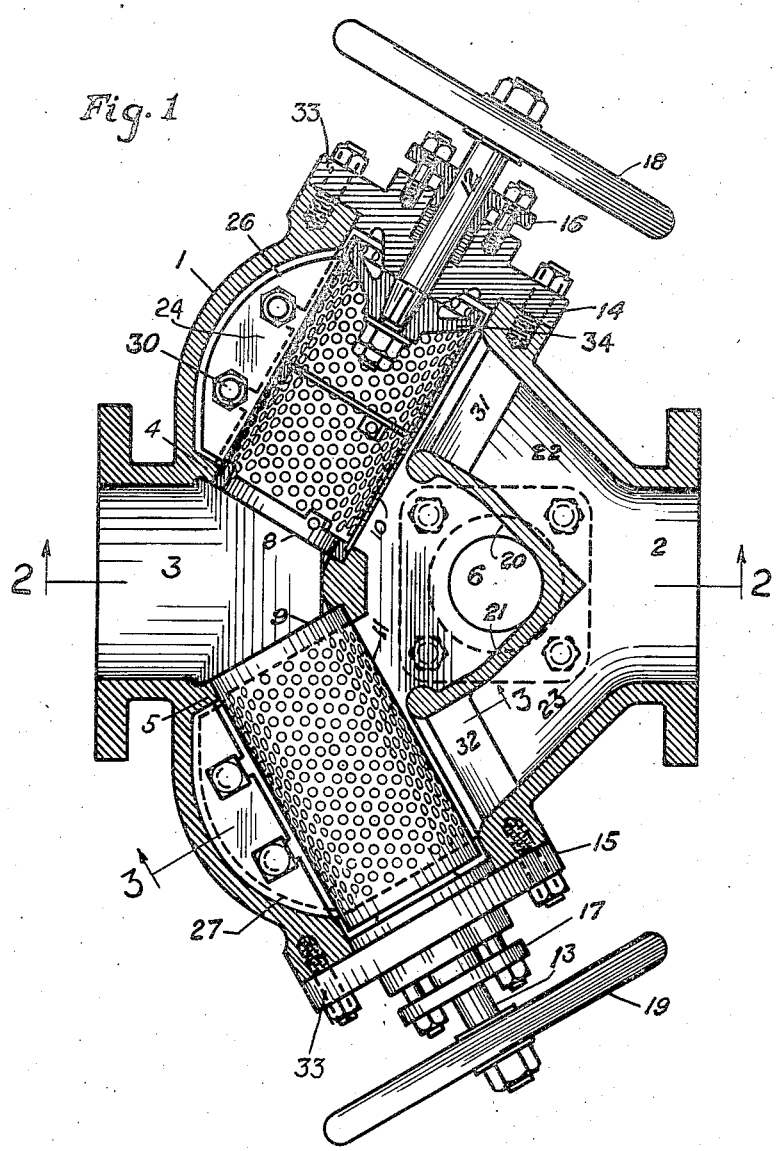
INVENTOR.
HAAKON HELLAN
BY
ATTORNEYS.

Aug. 1, 1944.   H. HELLAN   2,354,752
STRAINER
Filed Aug. 3, 1942   2 Sheets-Sheet 2
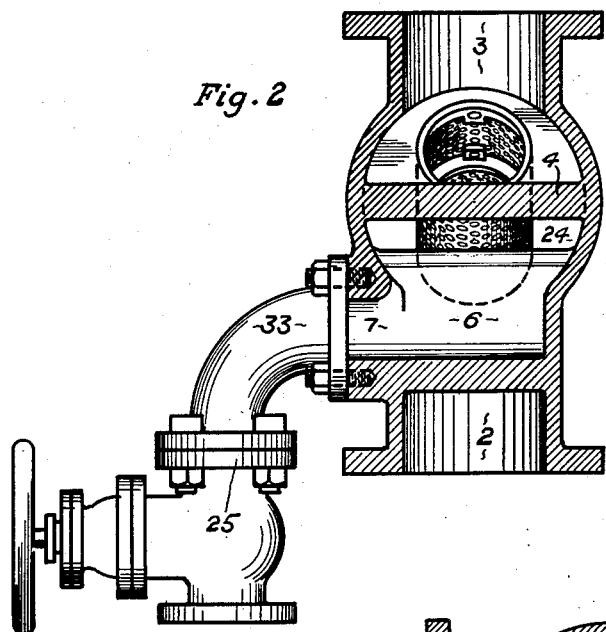
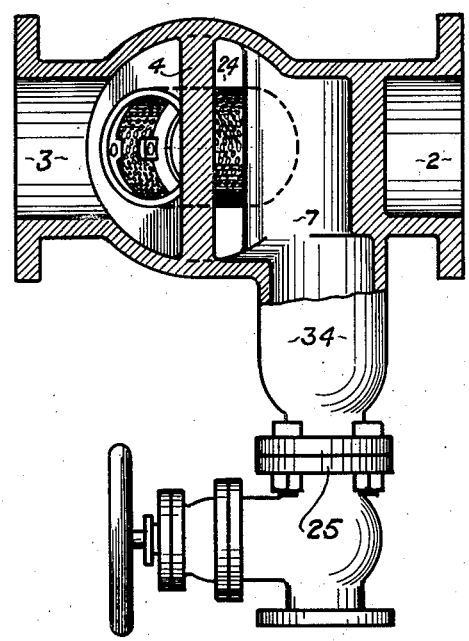
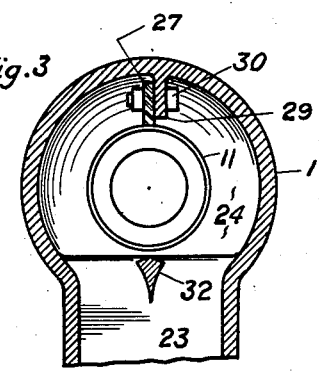
INVENTOR.
HAAKON HELLAN
BY
ATTORNEYS.

Patented Aug. 1, 1944

2,354,752

UNITED STATES PATENT OFFICE 2,354,752

STRAINER

Haakon Hellan, Cleveland Heights, Ohio

Application August 3, 1942, Serial No. 453,309

3 Claims. (Cl. 210—168)

The present invention relates to strainers for the cleaning of liquids flowing through pipe lines. It has extensive application in iron, steel and glass industries where high furnace temperatures necessitate water cooling of doors, valves and cooling plates in furnace linings. Water for this kind of service comes from lakes or rivers and contains a large variety of suspended matter, which must be eliminated to prevent clogging of water lines or passages in this water-cooled equipment. If water circulation is checked by sediment deposits and the furnace heat destroys the equipment the resultant damage is both costly and troublesome.

More particularly, this invention belongs to a type of strainer having a revolvable screen mounted in a casing with the inlet opening communicating with the exterior of a cylindrical screen, and the open end of the screen communicating with the outlet opening of this casing. Thus the liquid flow through the screen is from the outside to the interior of the screen.

It is advantageous to have the piping connections to this casing on a straight line, i. e., to have the inlet and outlet openings for this casing on the same central axis and thus avoid offsets in pipe. A strainer with only a single screen and aligned connections necessitates the use of crooked internal passages to conduct the liquid from the screen outlet to the casing outlet, involving flow losses and complicated castings. When installed in a horizontal run of pipe the strainers with a single screen are easily adapted to disposing of the sediments, but for an upward vertical flow from an underground main or from a pump the principle of straining through a cylindrical screen from the outside has presented great difficulties.

The effective opening from a single screen needs to be only as large as the pipe. Where the bearing for the screen's rotation is provided at the exit end within this effective opening its diameter must be increased and its construction strengthened to withstand the force from the flow against this larger diameter. Also more power is required to rotate the screen. Thus a screen of the smallest practical diameter is to be desired. Furthermore, a small diameter screen is better adapted to deflect the solid sediments in the liquid and is less liable to be damaged. This is because of the sharper curvature of a small diameter screen as contrasted with the flatter side of a large diameter screen.

Contrary to basket type strainers, where sediments collect and remain on the inside of the screen, the external flow type forming the basis for this invention takes advantage of the continuous flow as a means for helping to maintain a clean surface. Furthermore the maintenance of high velocity against the screen and through the casing is a prerequisite for the proper functioning of screens built according to this principle, as former strainers with large straining chambers slowed down the flow and invited sedimentation on the screen instead of settling out, thereby requiring frequent scraping of the outer surface.

An object of the present invention has been the construction of a strainer which is equally well adapted for vertical as for horizontal arrangement. A further object has been to provide a device which is effective in the removal of foreign particles from the liquid to be strained and which allows of easy cleaning of the screens by means of the flowing liquid. Provision is also made for scraping off the deposited particles which adhere to the screen.

Another object has been to use two or more screens for producing a symmetrical arrangement with the inlet and outlet as an axis, and furthermore, to meet the prevalent condition of upward flow by a construction with the inlet at bottom. Still another object has been to construct the screens with unobstructed open ends and minimum diameter to equal the pipe area. Another object has been to divide the casing with a wall or walls which separate a straining compartment from the outlet and to provide openings in the walls for supporting the outlet ends of the screens. A further object has been to provide a sediment pocket within the casing for the accumulation of sediment.

Still another object has been to protect the cylindrical screens from large particles carried in the liquid by introducing deflector ribs ahead of them and to shape these deflector ribs to produce a tangential flow against the screens. Another object has been to make the screens revolvable from the outside and to provide rigidly held stationary scrapers against the screens for removal of material attaching to them.

To the accomplishment of the foregoing and related ends, said invention then consists of the means hereinafter fully described and particularly pointed out in the claims, the annexed drawings and the following description setting forth in detail certain structure embodying the invention, such disclosed means constituting, however, but one of various structural forms in which the invention may be used.

In said annexed drawings:

Fig. 1 is a longitudinal section through a strainer with two screens according to my invention;

Fig. 2 shows, on a slightly reduced scale, a longitudinal transverse section through the center line for a vertical strainer with inlet at bottom or a section through Fig. 1 turned 90° with right side of drawing down. The section is taken as indicated by the lines 2—2 of Fig. 1;

Fig. 3 is a section on line 3—3 of Fig. 1; and

Fig. 4 is a view similar to Fig. 2 showing an arrangement for horizontal flow with the inlet at right.

Referring more particularly to Fig. 1, the strainer as shown comprises a casing 1 having an inlet 2 and an outlet 3 of equal size and in direct line with each other. The inlet and outlet are provided with flanged ends for attachment to flanges of a pipe line. This casing is cast in one piece and has integrally formed walls 4 and 5 for separating the chamber surrounding the strainers from outlet 3. The strainer compartment which houses the screens is designated by 24.

The casing 1 is symmetrical about axis through inlet and outlet, each side housing a screen 10 and 11, respectively. In flowing through the device the liquid stream is divided, part flowing through each screen. The screens are rotatably mounted in circular openings 8 and 9 in walls 4 and 5 on the one end and keyed to revolvable shafts 12 and 13 at the other ends. Shafts 12 and 13 are supported in casing covers 14 and 15, being rotatably mounted in stuffing boxes 16 and 17 therein. The outer shaft ends have handwheels 18 and 19 mounted thereon, which are used to rotate the strainer screens from outside the casing when accumulation of deposits makes this necessary as described below.

The screen center lines converge on a point on the strainer axis and form an angle of about 60° with its axis. A larger angle up to 90° would cause greater flow loss as the opposing streams meet at the outlet 3, and a smaller angle would lengthen the casing and reduce the sediment pocket 6.

At the inlet side of the casing are two dividing walls 20 and 21, forming an angle toward the inlet 2, and arranged in a way to define two inlet passages 22 and 23, formed by the dividing walls and the casing, to conduct the inflowing liquid and whose combined area is equal to area of inlet 2 so that the velocity of the flow is maintained toward screens 10 and 11. On the side of the walls 20 and 21 facing the center of the strainer a pocket 6 is formed which serves to collect the sediment strained from the liquid, which sediment is finally discharged through a discharge opening 7 (Figs. 2 and 4).

To deflect the flow of liquid at the inner ends of passages 22 and 23 deflector ribs 31 and 32 are arranged, the shape of which is seen from Fig. 3. The flow of liquid is deflected by these ribs to prevent blows from suspended solid objects against the screens 10 and 11 as the liquid passes into the strainer compartment 24, where it flows smoothly over and along the screens, down by the exit walls 4 and 5 while continuously passing through the perforations to the interior of the screens. Sediments are left on the outside of the screens and are carried by the flow into the sediment pocket 6, where they accumulate over a long period before being flushed out under line pressure, when valve 25 is opened. Reference to Fig. 2 shows outlet passage 7 connected to valve 25 by an elbow 33. On the other hand, Fig. 4 shows a direct bottom outlet for the same purpose.

The arrangement of a scraper 27 is shown in Fig. 3. It is positioned to extend radially toward screen 11 and is fastened by suitable bolts 30 to a rib 29 formed on the casing 1. A corresponding arrangement is provided in the other half of the casing for a scraper 26 which cleans the screen 10. These scrapers become operative as soon as the screens are rotated by means of the handwheels 18 and 19, when the flow through the strainer falls off to indicate a partial clogging of the perforations.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. A liquid strainer comprising a casing, inlet and outlet openings in said casing, internal dividing walls converging from the outlet and traversing said casing and defining a strainer compartment therebetween, said dividing walls having openings therethrough for effecting communication between said strainer compartment and said outlet opening, cylindrical screens positioned in said strainer compartment with the open ends thereof supported in the openings of said dividing walls, a diverging wall structure at said inlet forming individual inlet passages to each screen within the casing, and a central sediment pocket between said diverging walls.

2. A liquid strainer comprising a casing, inlet and outlet openings positioned on the same central axis, dividing walls converging from the outlet into said casing and defining a strainer compartment within said casing, tubular screens with their outlet ends mounted in openings on said dividing walls and communicating with said outlet opening in the said casing, a diverging wall structure at the inlet for dividing and distributing the liquid flow to each screen a sediment collecting pocket located between the divergent branches of said wall structure, a sediment discharge opening at the bottom of said sediment collecting pocket and means for closing and opening said discharge opening.

3. A liquid strainer comprising a casing, vertically aligned inlet at the bottom and outlet at the top, symmetrically arranged dividing walls traversing said casing and converging from said outlet, and defining a strainer compartment within said casing, circular openings in said dividing walls for communication between said strainer compartment and said outlet, rotatably mounted cylindrical screens with outlet openings journaled in openings of said dividing walls and means for rotating the screens from the outside, individual inlet passages within the casing to each screen formed by transverse dividing walls diverging from casing inlet and having a combined area equal to the cross-sectional area of said casing inlet, a central sediment collecting pocket between the diverging dividing walls and a sediment discharge opening at the bottom of said pocket.

HAAKON HELLAN.